Sept. 20, 1932.   S. B. ALCORIZA   1,878,090
SIGNAL FOR MOTOR VEHICLES
Filed Sept. 11, 1929    2 Sheets-Sheet 1
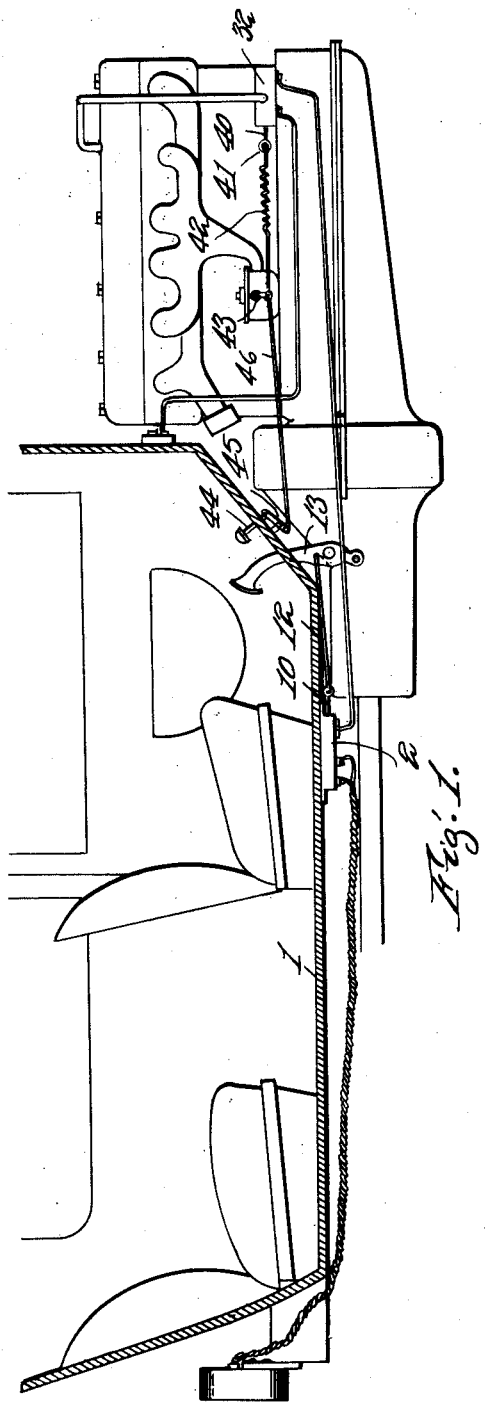
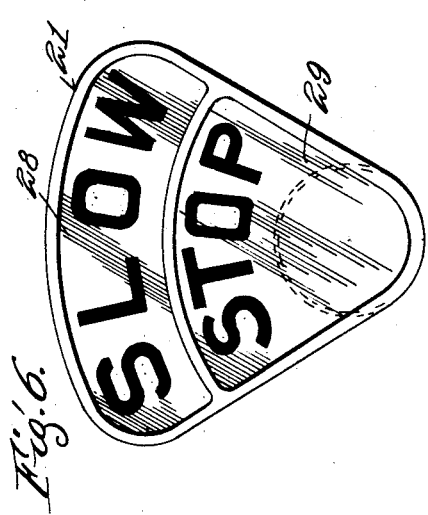
S. B. Alcoriza
INVENTOR.
BY Lacey & Lacey
ATTORNEYS

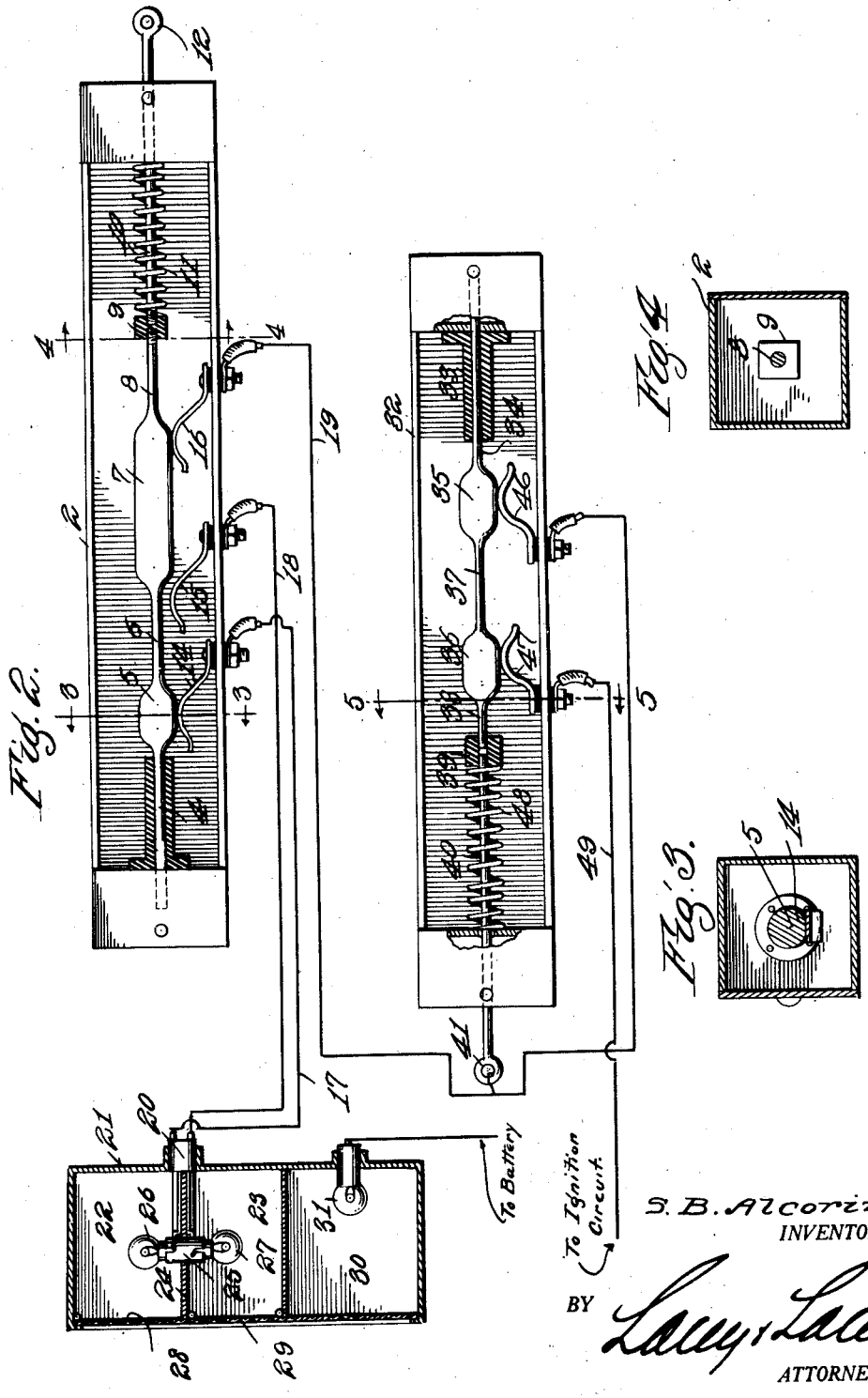

Patented Sept. 20, 1932

1,878,090

UNITED STATES PATENT OFFICE

SOFRONIO B. ALCORIZA, OF STOCKTON, CALIFORNIA

SIGNAL FOR MOTOR VEHICLES

Application filed September 11, 1929. Serial No. 391,891.

The present invention is directed to improvements in signals for motor vehicles.

The primary object of the invention is to provide a device of this character so constructed that when the service brake pedal is actuated to apply the brakes, a circuit will be closed to illuminate a Stop signal.

Another object of the invention is to provide a signal of this nature wherein the accelerator pedal, when in its normal or inoperative position, will effect the closing of the circuit to illuminate the Slow signal.

Another object of the invention is to provide novel forms of switches so related that they will effectively function to illuminate the Stop and Slow signals upon actuation of the service brake pedal or accelerator pedal.

With these and other objects in view, the invention resides in the novel features of construction, formation, combination and arrangement of parts to be hereinafter more fully described, claimed and illustrated in the accompanying drawings, in which:

Figure 1 is a sectional view through a portion of a motor vehicle, showing the switches arranged thereon.

Figure 2 is a somewhat diagrammatic view showing the relative arrangement of the brake pedal actuated switch and accelerator pedal operated switch in connection with the signal casing.

Figure 3 is a sectional view on the line 3—3 of Figure 2.

Figure 4 is a sectional view on the line 4—4 of Figure 2.

Figure 5 is a sectional view on the line 5—5 of Figure 2.

Figure 6 is a rear view of the signal casing.

Referring to the drawings, 1 designates the floor of the motor vehicle and fixed to the under surface thereof in any appropriate manner is a switch casing 2 formed of suitable material and in the rear end of which is fixed a sleeve 3 formed of insulating material and in which is slidable the stem 4 of the switch structure. The stem 4 has a contact body 5 formed integral therewith and which terminates in a rod 6, said rod being merged with the contact body 7. The bodies 5 and 7 are of the same diameter but vary in length, the latter being somewhat longer than the former, as clearly shown in Figure 2 of the drawings. The forward end of the body 7 terminates in a stem 8 which is threaded in a block 9 formed from suitable insulating material. Having its inner end extended through the front end wall of the casing 1 is a rod 10, said rod being slidable in said wall and having its rear end threaded in the block 9. Encircling the rod 10 and interposed between the block 9 and front end wall of said casing is a coil spring 11 which normally tends to urge the bodies 5 and 7 rearwardly. The forward terminal of the rod 10 is provided with an eye 12 which engages the rear end of the link 12', the forward end of said link being pivotally engaged with the service brake pedal 13.

The casing 2 has mounted therein spring contacts 14, 15 and 16, adapted to yieldably contact with the bodies 5 and 7, said contacts being suitably insulated from the casing 1. The contacts are in circuit with the conductors 17, 18 and 19, respectively, as clearly shown in Figure 2 of the drawings. The conductors 17 and 18 lead to the plug 20 mounted in the signal casing 21. This casing is divided into upper and lower chambers 22 and 23 by the partition 24 which supports the double socket 25 so that the bulbs 26 and 27 carried thereby will be disposed, respectively, within the chambers 22 and 23. The rear end of the chamber 22 is closed by a green lens 28 having marked thereon the word Slow while the red lens 29 closing the rear end of the casing 23, has thereon the word Stop. Below the partition 24 is a chamber 30 closed by the lens 30a and into which extends the bulb 31, the chamber 30 constituting the tail light for the vehicle.

The switch controlled by the accelerator pedal is constructed in substantially the same manner as the brake pedal controlled switch and comprises a casing 32 having fixed to its forward end wall a sleeve 33 of insulating material and in which is slidable a stem 34, the rear end of said stem being connected with the contact body 35 which, in turn, is connected to the contact body 36 by the rod 37. The contact body 36 terminates at its rear end in a stem 38 which is threaded in the block 39 of insulating material. Also threaded in the block 39 is the forward end of the rod 40 which also slides in the rear end of the casing and is provided with an eye 41. Connected to the eye 41 is a spring 42, the rear terminal of which is connected to the throttle valve controlling arm 43.

The accelerator pedal 44 rocks a lever 45 when it is depressed, whereupon the link 46 connecting the lever 45 and arm 43, is moved rearwardly to open the throttle valve, as customary. The contact bodies 35 and 36 are held in position for engagement with the contact springs 46 and 47, respectively, by the coil spring 48 encircling the stem 40 and is interposed between the rear end of the casing 32 and block 39.

The contact body 36 and conductor 47 are in circuit with the ignition system through the conductor 49, while the conductor body 35 and contact 46 are in circuit with the conductor 19 leading from the contact 16 of the brake pedal controlled switch device. It will thus be seen that both switch structures are inactive until the ignition switch is turned on. When the ignition is on and the contact bodies 35 and 36 engage the contacts 46 and 47 respectively, the circuit is completed through the conductor 19, contact 16, contact body 7, stem 6, and contact body 5, and thence through the contact spring 14 and conductor 17 to illuminate the bulb 26 so that the Slow sign will be displayed. As soon as the accelerator pedal is pressed to open the throttle valve and increase the speed of the vehicle, the contact bodies 35 and 36 will be moved from engagement with the contact springs 46 and 47, thus breaking the circuit and extinguishing the bulb 26. When the driver slows up in approaching a corner or an intersection, or for any other reason, and relieves the pressure upon the accelerator pedal, the spring 40 will slide the stem and thus the contact bodies 35 and 36 into engagement with the contact springs 46 and 47, thus closing the circuit and illuminating the bulb 26 to illuminate the Slow signal. Obviously, when the brake pedal is depressed, the contact bodies 5 and 7 will slide forwardly, whereupon the body 5 will engage the contact spring 15 while the body 7 will remain in contact with the contact 16 owing to its length. The circuit will then be closed through the bodies 5 and 7 and contacts 15 and 16 and through the conductor 49, contact bodies 35 and 36, thence through the conductor 19 to illuminate the bulb 27 to display the Stop signal. Upon release of the brake pedal, the spring 11 will slide the contact body 5 into engagement with the contact 14.

From the foregoing, it is thought that the construction, operation and many advantages of the herein described invention will be apparent to those skilled in the art, without further description, and it will be understood that various changes in the size, shape, material, proportion and minor details of construction may be resorted to without departing from the spirit or sacrificing any of the advantages of the invention.

What is claimed is:

A device of the class described including an elongated casing, spring contacts arranged longitudinally within the casing and insulated therefrom, a guide sleeve carried on one end of the casing, said sleeve being formed of insulating material, a stem carried at one end of the casing and slidable through the guide sleeve, said stem being insulated from the casing by said sleeve and being provided with enlargements to coact with said spring contacts for closing circuits, an operating rod slidable through the opposite end of the casing and associated with the stem, a connector of insulating material coupling said rod and stem, and a coil spring surrounding the rod within the casing and cooperating with the connector and casing for normally retaining the rod in inoperative position.

In testimony whereof I affix my signature.

SOFRONIO B. ALCORIZA. [L. S.]